United States Patent
Quelene

(10) Patent No.: US 6,453,306 B1
(45) Date of Patent: *Sep. 17, 2002

(54) INTERNET COMMERCE METHOD AND APPARATUS

(75) Inventor: Jacques Quelene, Gif sur Yvette (FR)

(73) Assignee: ICT Software S.A., Gif sur Yvette (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/201,934

(22) Filed: Dec. 1, 1998

Related U.S. Application Data
(60) Provisional application No. 60/072,473, filed on Jan. 26, 1998.

(51) Int. Cl.[7] .............................................. G06F 17/60
(52) U.S. Cl. .............................. 705/80; 705/26; 705/77
(58) Field of Search ................................ 705/1, 26, 77, 705/80, 27, 37, 39, 28, 38; 709/219

(56) References Cited

U.S. PATENT DOCUMENTS

| | | | | |
|---|---|---|---|---|
| 5,544,040 A | * | 8/1996 | Gerbaulet | 705/26 |
| 5,732,400 A | * | 8/1996 | Mandler et al. | 705/26 |
| 5,717,989 A | * | 2/1998 | Tozzoli et al. | 705/37 |
| 5,794,207 A | * | 8/1998 | Walker et al. | 705/1 |
| 5,950,173 A | * | 9/1999 | Perkowski | 705/26 |

FOREIGN PATENT DOCUMENTS

WO   WO 97/03423   1/1997

OTHER PUBLICATIONS

Meece, "Start–up offers payment system for data bought over the internet", American Banker, v159, u203, pp. 1–3.*

Speidel et al., "Impact of electronic contracting on contract formation under revised UCC Article 2, Sales", C878 ALI–ABA 335, Dec. 1993.*

Ritter, "Scope of the Uniform Commercial Code:Computer contracting cases and electronic commercial practices", 45 Bus. Law 2533, Aug. 1990.*

Rosso, "Ticket bidding firm closes its doors", Travel Weekly, Mar. 1992.*

Pelline, "Travelers bidding on airline tickets; SF firm offers chane for cut–rate fares", San Francisco Chronicle, Section A4, Aug. 1991.* www.softway.com, entitled "Softway's Distribution Model", 9/12/1997, pp. 1–3.

* cited by examiner

Primary Examiner—Vincent Millin
Assistant Examiner—Cuong H. Nguyen
(74) Attorney, Agent, or Firm—U. P. Peter Eng; Wilson Sonsini Goodrich & Rosati

(57) ABSTRACT

A system that permits commercial transactions over a network of computers is described. In one example, the network of computers supports communications between business relation data structures. The business relation data structures reflect credit relationships between two or more businesses. To perform a commercial transaction, a consumer accesses a vendor's Web site. The consumer selects an item to purchase from that Web site. The vendor computer then generates a proposal. The proposal includes an item identifier and a price. That proposal is then propagated to all of the business relation data structures with which the vendor's business relation data structure can communicate. At each one of the recipient business relation data structures, the proposal is modified and forwarded on to other business relation data structures. The modifications are based upon the credit relations between businesses. This modification and forwarding continues until the consumer's computer is reached with a set of proposals. The consumer then accepts a proposal that best suits her needs. This acceptance is then propagated back to the vendor computer. The vendor can then deliver the item to the consumer.

27 Claims, 6 Drawing Sheets

Extranet 300

INTERNET COMMERCE METHOD AND APPARATUS

RELATED APPLICATIONS

This application relates to, claims the benefit of the filing date of, and incorporates by reference, the United States provisional patent application Ser. No. 60/072,473, entitled "Internet Commerce Method and Apparatus," inventor Jacques Quelene, filed Jan. 26, 1998.

COPYRIGHT NOTICE

A portion of the disclosure of this patent document contains materials that are subject to copyright protection. The copyright owner has no objection to the facsimile reproduction by any one of the patent disclosure, as it appears in the Patent and Trademark Office patents, files or records, but otherwise reserves all copyright rights whatsoever.

BACKGROUND OF THE INVENTION

1. Field of the Invention

This invention relates to the field of networked computer systems and more particularly the invention relates to using networked computer systems to conduct electronic commerce.

2. Description of the Related Art

Electronic commerce is rapidly growing. Increasing numbers of purchases are being conducted electronically over public networks like the Internet as well as private networks such as corporate intranets. To date, electronic commerce has primarily been employed in the delivery of tangible goods such as computer equipment, bouquets of flowers, airline tickets, etc. Electronic commerce can also be used in the delivery of digital products such as newspaper articles, stock quotes, database query results, movies, etc. Electronic commerce primarily reduces business channel costs. These are the costs associated with processing orders, credit checking, handling payments, etc. Electronic commerce is important for the delivery of digital products in order to keep costs in line with the value of the digital products.

Accordingly, vendors should adopt a method for electronic commerce suitable to the types of transactions that they will be doing with their purchasers. There are three ways vendors presently enable purchasers to participate in electronic commerce: using accounts, accepting credit cards, and accepting electronic cash. Each of these solutions is a variation of traditional commerce methods.

Account based solutions are modeled on the way companies traditionally did business with one another—purchase orders and invoices. This system requires that vendors know purchasers because the vendor is extending the credit. Further, as the number of purchasers increases, the paperwork involved in handling the purchase orders and billing customers becomes immense. Although electronic commerce eliminates some of the paperwork, and partially automates the systems, account based solutions are not efficient for either the purchaser or the vendor. Purchasers are required to remember account information for a multitude of vendors and vendors are required to take on a secondary business of providing credit. Given these limitations, it is unsurprising that account based systems are generally not in widespread use in electronic commerce.

Credit card based transaction systems eliminate the credit issue for vendors, but incur other costs. Credit card providers charge 1–3% on each transaction. This charge covers the costs for security, insurance, and the centralized system. This charge makes using credit cards for small purchases unattractive. When electronic commerce is used for the purchase of expensive tangible goods, like computer equipment or plane tickets, credit cards function as well as they do outside the electronic commerce realm. However, it is not feasible to use credit cards for the types of low cost, information-oriented transactions that are a component of electronic commerce.

Credit card transactions also do not support multiple currencies with ease. A vendor might present a purchaser with a display of different currencies, as an indication of the price, but the actual exchange rate that will be in effect when the credit card company settles the accounts may be different. Thus, credit cards do not support reliable pricing in a multi-currency environment.

Credit cards also do not work well in business settings. The credit card approval process looks only to the credit limit on the card, e.g. the credit of the business or the credit line on that corporate card, and not to the budget or authorization process of the company. Further, the company has no control over the purchasing process until after a firm commitment has been made, e.g. when the statement is issued. Therefore, it is not possible to enforce business specific rules on credit card purchases. Credit cards also do not work well for detailed expense tracking. It is difficult at the time of purchase to associate internal tracking or account information with a purchase.

Electronic cash solutions have been created to address some of the shortcomings of credit cards for electronic commerce. A buyer gets "coins" from her/his bank, and gives them to a merchant when she/he has to pay. The "coins" are stored as electronic cash either on a smart card or in a software application on a computer. Duplicating a sequence of bits is a lot easier than counterfeiting physical coins or notes, so any electronic cash solution must have systems for verifying the electronic cash and preventing double spending. This requires that the electronic cash be verified by the bank at transaction time. These costs limit the use of the system to transactions that involve at least $0.50. Thus, it is not feasible to use electronic cash for the types of low cost-information oriented transactions that are a component of electronic commerce.

In addition, the various technologies do not currently interoperate. Unlike the credit card industry that is dominated by a small number of mature providers with a high degree of market penetration, electronic cash solutions have a low degree of market penetration. Thus, both the merchant and the buyer must have accounts with the same electronic cash provider.

Present electronic commerce solutions are not well suited to commerce between vendors and purchasers that do not know one another. Present electronic commerce solutions are too costly on a per transaction basis for low priced information purchases that could make up the bulk of electronic commerce. Present electronic commerce solutions do not operate well between different payment methods. Present electronic commerce solutions do not easily permit multi-currency transactions. Accordingly, what is needed is an electronic commerce technique that permits vendors and purchasers to complete extremely large volumes of transactions with very little transactional overhead in multiple currencies with differing types of payment methods.

SUMMARY OF THE INVENTION

Some embodiments allow for electronic commerce over a computer network. The network has a purchaser computer and a vendor computer. The network supports business relation structures that represent agreements to extend credit between businesses. The network uses the business relation structures for decision making processes. The network transmits business messages that relate to agreements between businesses, including messages relating to extending credit for purchases.

In some embodiments, the vendor computer creates a proposal. That proposal identifies an item to be purchased as well as the vendor price and other transaction parameters.

In one embodiment, the proposal is sent to an intermediary that shares a business relation with the vendor. This intermediary sends the proposal to other intermediaries via the network until one or more proposals reaches the purchaser. At each stage, the proposal is modified by the intermediary. The modifications can include changing the price to reflect the cost of extending credit and the value added by the intermediary. The purchaser computer may receive multiple proposals depending on the number of paths between the vendor and the purchaser.

A selection signal is received on the purchaser computer that indicates the purchaser wishes to accept one of the proposals. The selected proposal is then transmitted to the vendor computer, along the same path as the initial path. At that point, the transaction is complete and the vendor delivers the good, or service, identified by the proposal.

In some embodiments, the vendor price is specified in the vendor's currency and the proposal specifies that the purchaser computer requires the price specified in a different currency. The price associated with some of the proposals is then specified in the purchaser's currency and charges are added to the vendor price of those proposals for performing the currency conversion.

In some embodiments, the computers attach cryptographic signatures to the proposals and the selected proposal. For example, a vendor computer might only accept proposals that are cryptographicly signed by the purchaser computer.

In some embodiments, a receipt is issued by the vendor computer when the vendor receives the selected proposal.

In some embodiments, credit histories and transaction performance histories limit the search of the business relation structures. For example, business relation structures that indicate a business has poor credit history will not be included in the paths found by the search of the business relation structures.

In some embodiments, the vendor can quickly establish a commerce site from an existing web site by associating a flag containing a price with content and goods that come with a price. Then, the vendor operates a cash register program so that the data flowing from the web server to the client is intercepted by the cash register. The cash register delays delivery of the data to the client while a proposal is generated and routed to the client. Once the proposal has been accepted, the cash register will complete the delivery of the requested data to the client.

Although many details have been included in the description and the figures, the invention is defined by the scope of the claims. Only limitations found in those claims apply to the invention.

DETAILED DESCRIPTION

A. System Overview

Figure 1:
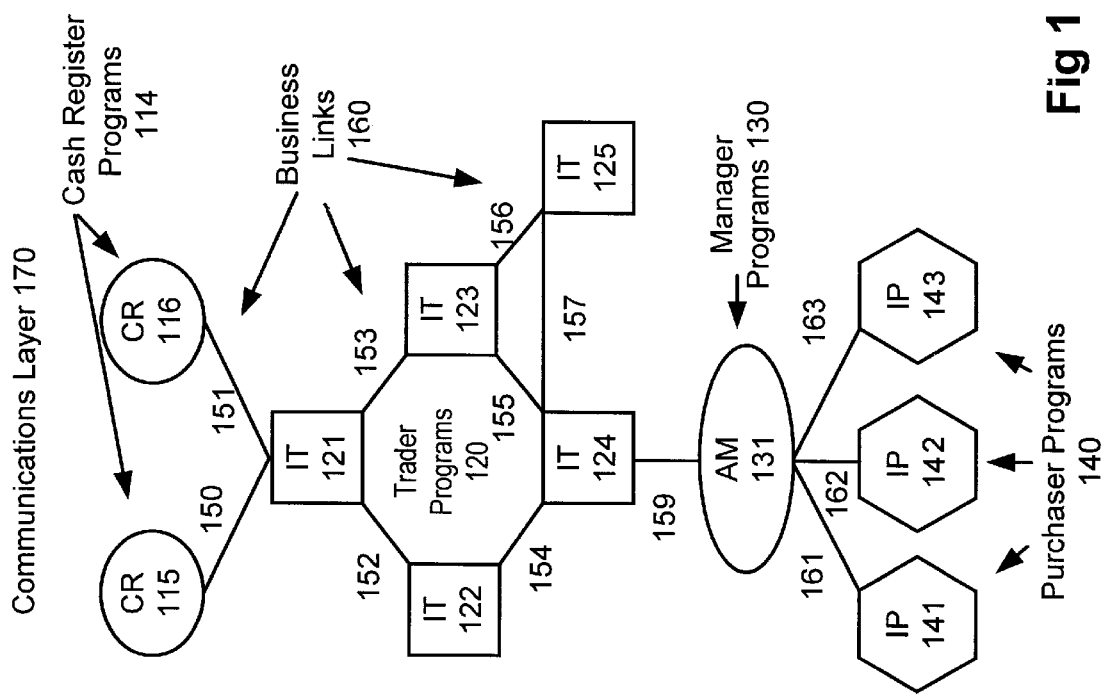
FIG. 1 illustrates one embodiment of the invention with computer systems coupled in a network supporting transactions between the computer systems on the network.
Figure 1:
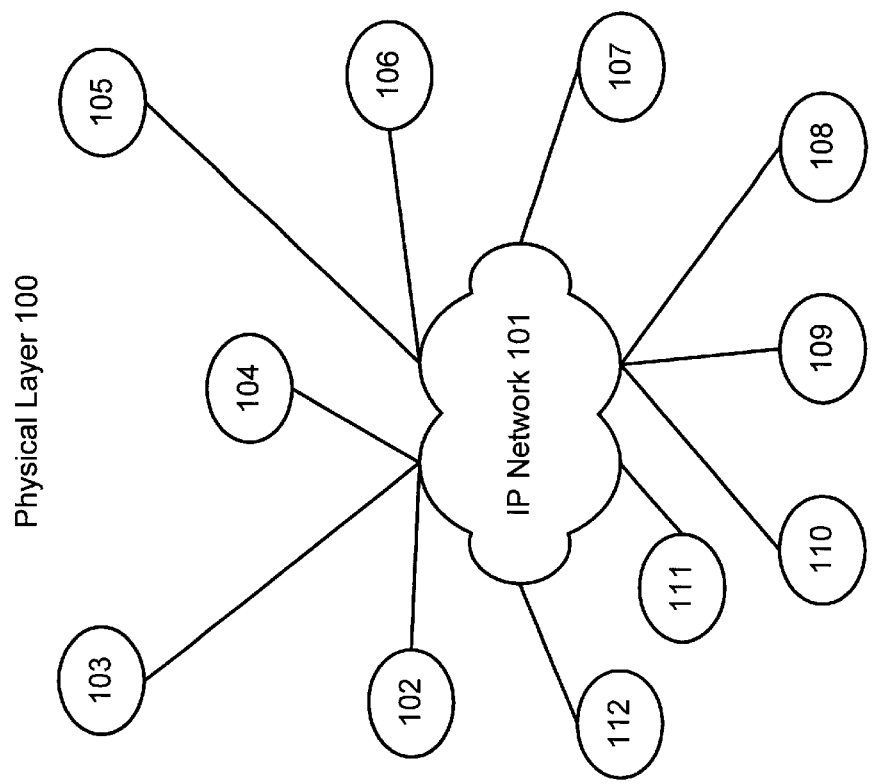

FIG. 1 depicts networked computer systems including an embodiment of the invention. FIG. 1 includes a physical and a higher level view of the system. The following first lists the elements of FIG. 1, then describes the elements, and then describes how they work together.

This paragraph lists the elements in FIG. 1. FIG. 1 shows a physical layer 100 comprising: an IP Network 101, a computer 102, a computer 103, a computer 104, a computer 105, a computer 106, a computer 107, a computer 108, a computer 109, a computer 110, a computer 111, and a computer 112. FIG. 1 also shows a communications layer 170 comprising: the cash register programs 114, a cash register(CR) 115, a CR 116, the trader programs 120, an internet trader (IT) 121, an IT 122, an IT 123, an IT 124, an IT 125, the manager programs 130, an account manager (AM) 131, the purchaser programs 140, an internet purchaser (IP) 141, an IP 142, an IP 143, the business links 160, a business link (BL) 150, a BL 151, a BL 152, a BL 153, a BL 154, aBL 155, aBL 156, aBL 157, aBL 159, aBL 161, aBL 162, and aBL 163.

This paragraph describes the interconnections between the elements of FIG. 1. The IP Network 101 is coupled to the computer 102, the computer 103, the computer 104, the computer 105, the computer 106, the computer 107, the computer 108, the computer 109, the computer 110, the computer 111, and the computer 112. The CR 115 is coupled to the IT 121 by the BL 150. The CR 116 is coupled to the IT 121 by the BL 151. The IT 121 is coupled to the IT 122 by the BL 152. The IT 121 is coupled to the IT 123 by the BL 153. The IT 122 is coupled to the IT 124 by the BL 154. The IT 123 is coupled to the IT 124 by the BL 155. The IT 121 is coupled to the IT 125 by the BL 156. The IT 124 is coupled to the IT 125 by the BL 157. The IT 124 is coupled to the AM 131 by the BL 159. The AM 131 is coupled to the IP 141 by the BL 161. The AM 131 is coupled to the IP 142 by the BL 162. The AM 131 is coupled to the IP 143 by the BL 163.

The following paragraphs describe the elements of FIG. 1. The physical layer 100 corresponds to the underlying physical computers and network over which electronic commerce occurs. The IP Network 101 is the Internet, or any network, such as an intranet, an extranet, or a private switched network. The computer 102, the computer 103, the computer 104, the computer 105, the computer 106, the computer 107, the computer 108, the computer 109, the computer 110, the computer 111, and the computer 112 may be personal computers, handheld computers, workstation computers, server computers, clusters of computers, or some other computer. Computers used by the purchaser programs 140 are more likely to be personal computers, handheld computers, television set-top boxes, or thin client computers like the Network Computers proposed by Sun, Oracle and IBM, but this is not required.

The cash register programs 114, the trader programs 120, the manager programs 130, and the purchaser programs 140 maintain business relation structures containing computer readable information about business relations. The business links 160 represent the communications channels between business relation structures. The communications layer 170 shows the network formed by the business relation structures.

The cash register programs 114, the trader programs 120, the manager programs 130, and the purchaser programs 140 may be computer programs, computer processes, computer tasks, or some other computer executable code. A computer program is a sequence of instructions for a computing device.

The cash register programs 114 include the CR 115 and the CR 116. The cash register programs 110 are operated by businesses or individuals that have products, either tangible or digital, for sale. Products can be either a product or a service. Collectively the operators of the cash register programs 1 10 are called vendors. The cash register programs 110 allow vendors to request and collect money from purchasers for products the vendor is selling by using a series of intermediaries to extend credit to the purchaser.

The trader programs 120 include the IT 121, the IT 122, the IT 123, the IT 124, and the IT 125. The trader programs 120 are operated by businesses or individuals that act as intermediaries in transactions between vendors and purchasers. Collectively the operators of the trader programs 120 are called intermediaries. The intermediaries act as creditors and debtors with one another. Intermediaries relieve vendors of the burden of acting as creditors to their purchasers. This has the effect of increasing the amount of credit available to purchasers because it permits purchasers to buy from vendors who do not know them. The intermediaries may have the trader programs 120 assess charges to cover the costs of extending credit for a transaction. The trader programs 120 help the intermediaries perform these functions.

The manager programs 130 include the AM 131. The manager programs 130 are operated by businesses or individuals that provide credit services to purchasers, such as invoicing and billing, or other value added services, such as training. Collectively the operators of the manager programs 130 are called account managers. They can be regular account managers, corporate account managers, or gateway account managers. Gateway account managers can enable different payment techniques. For example, a gateway account manager could accept payments using the secure electronic transaction (SET) protocol for credit cards. The purchaser account mangers may have the manager programs 130 assess charges to cover the costs of extending credit for a transaction.

The purchaser programs 140 include the IP 141, the IP 142, and the IP 143. The purchaser programs 140 are typically operated by individuals seeking to purchase products. The purchaser programs 140 may also operate independently of an individual based on user or corporate preferences and requests. Collectively the operators of the purchaser programs 140 are called purchasers. The purchaser programs allow purchasers to purchase goods.

In the example of FIG. 1, the CR 115 is running on the computer 103. The CR 116 is running on the computer 105. The IT 121 is running on the computer 104. The IT 122 is running on the computer 102. The IT 123 is running on the computer 123. The IT 124 is running on the computer 112. The IT 125 is running on the computer 107. The AM 131 is running on the computer 111. The IP 141 is running on the computer 110. The IP 142 is running on the computer 109. The IP 143 is running on the computer 108. The invention does not rely on the locations of the participants to a transaction in the physical layer 100. It is possible for the same computer in the physical layer 100 to operate multiple programs and play multiple roles.

The individuals and businesses that are vendors, purchasers, intermediaries, and account managers form business relations to conduct business. A business relation structure represents an agreement between two or more entities to extend credit to one another. Typically, a purchaser will select one or more account managers to handle his/her purchasing needs. The business relationship between purchaser and account manager is that of debtor and creditor respectively. When a corporation acts as the account manager, the account manager program serves to control proposed spending decisions by purchasers, e.g. purchasing agents of the corporation.

Vendors similarly will select one or more intermediaries to extend credit to purchasers on their behalf. The business relationship between vendors and intermediaries is that of creditor and debtor respectively. Intermediaries will form agreements and partnerships with other intermediaries. The business relationships between intermediaries can take many forms. For example, an intermediary might agree to be a debtor to another intermediary, but refuse to extend credit to that intermediary because of a bad past payment history. Account managers form business relations with one or more intermediaries. The business relationship between account managers and intermediaries is that of debtor and creditor respectively.

If it is possible to find a sequence of business links between a vendor and a purchaser, then that vendor and that purchaser can do business with one another. For example, the CR 115 and the IP 141 can do business with one another because <BL 150, BL 152, BL 154, BL 159, BL 161> is a sequence of business links that couple the CR 115 and the IP 141. In the example and FIG. 1, it is possible for all the vendors and all the purchasers to do business with one another because at least one sequence of business links can be found between each vendor and each purchaser.

The steps for completing a transaction will now be described. When a purchaser using the IP 141 is reviewing the goods the CR 115 has for sale, the IP 141 sends a selection signal to the CR 115 indicating an item the IP 141 is interested in purchasing. In some embodiments, the CR 115 uses the World Wide Web (WWW) to present the items for sale. The CR 115 is able to use other protocols to present the items for sale such as electronic mail messages, file transfer protocol file transmissions and the like. Using commercially available browser software such as Netscape Navigator™, the IP 141 sends the selection signal to the CR 115 by transmitting the address of a link embedded in the WWW page to the CR 115. The address corresponds to the item the IP 141 wishes to purchase. The CR 115 will then generate a proposal identifying a good for sale and the price of the good.

Rather than deciding whether the IP 141 is a good credit risk, the CR 115 will take advantage of the network created by the business links 160 and the corresponding business relations to enable the purchase. The business relation structures will be used to convey the proposal to the IP 141. Each program in the network of business links may add a different markup for the credit services provided. The markup is based on the business relations needed to extend credit as well as the value added services, if any, provided by the business relations. For this reason, multiple proposals for the purchase of the same good may be transmitted to the IP 141. Each proposal will correspond to a different sequence of business links between the CR 115 and the IP 141.

In this example, the IP 141 has signaled to the CR 115 that it is interested in proposals for the purchase of a specific good. The CR 115, after generating the proposal, then transmits the proposal to all of its business relations as identified in business relation structures. In this case the CR 115 transmits the proposal to the IT 121. The IT 121 then examines the proposal and decides whether to facilitate the proposal. Assuming the IT 121 decides to facilitate the proposal, the IT 121 will add a markup for extending credit and transmit the proposal over the network to some or all of its business relations based on the information stored in the routing tables of IT 121. This process of reviewing the proposal and forwarding it to business relations continues until one or more modified proposals reach the IP 141.

In this example, the IT 121 sends the proposal to the IT 122 and the IT 123. The IT 122 sends the proposal to the IT 124. The IT 123 sends the proposal to the IT 124 and the IT 125. The IT 125 sends the proposal to the IT 124. The IT 124 sends three different proposals for the same identified good to the AM 131. The three proposals will be different because each reached the AM 131 by a different sequence of business links and thus the price, and perhaps other terms, will differ among the proposals.

After adding its markup, the AM 131 sends the proposals to the IP 141. The IP 141 then receives a selection signal indicating which proposal out of the set of proposals that have been received is accepted. The process of receiving the selection signal is described below.

Once that selection is made, the selected proposal—or order—is transmitted back to the manager programs 130, the trader programs 130, and then the CR 115 in reverse order from the sequence of business links that correspond to the order.

When the CR 115 receives the order, the contract has been made. It is time for the CR 115 to deliver the purchased good. The CR 115 also sends a receipt to the IP 141. The receipt indicates the goods that were purchased by the IP 141. In one implementation, the receipt can also be used by IP 141 to re-request the purchased data for a predetermined period.

At appropriate intervals, defined by the business relations, the entities in the business relations pay back the credit extended. Different business relations may define different payment terms. For example, the purchaser programs 140 are typically operated by individuals who might be billed on a weekly or monthly basis. The trader programs 120 are typically operated by banks and other large business and as such, they might adopt policies that require more frequent payments. Regardless of the amount of credit extended or the number of transactions, participating entities can always provide their business relations with detailed invoices describing the transactions for which debt is owed.

This process of conveying the proposals across the business links 160 from the cash register programs 114 to the purchaser programs 140 occurs quickly. To speed the process, the trader programs 120 may employ caching algorithms that speed the identification of business relations on the path to the IP 141. The trader programs 120 may also employ heuristics to limit the extension of credit to bad credit risks or favor the use of business relations that result in a higher percentage of accepted proposals. For example, the IT 123 might recognize that only 10% of the proposals the IT 123 sent to the IT 125 have been accepted, but 90% of the proposals it sent to the IT 124 have been accepted. Accordingly, the IT 123 might send fewer proposals to the IT 125.

As transactions occur and business relation structures are modified, the business links 160 are added and removed. The communications layer 170 changes as the business links 160 are added and removed. Thus, the ability of a vendor and a purchaser to transact business depends on the status of the communications layer 170. For example, if the IT 124 is a small intermediary with low credit limits with its business relations, then there may be occasions on which the CR 115 and the IP 141 can not do business until the IT 124 has paid down its debt. Similarly, the IT 122 might owe the IT 121 the maximum amount of money allowed by the business relation between the parties, accordingly the IT 121 will not transmit further proposals to the IT 122 until the IT 122 pays down its debt.

If there are no paths between the CR 115 and the IP 141 in the communications layer 170, the CR 115 will transmit an error message to the IP 141 using the physical layer 100. The error message can include information describing the problem and, if appropriate, the identity of the program that refused to extend credit.

In one implementation, the participants cryptographicly sign proposals. Cryptographic signatures offer assurances of non-repudiation as well as protection against fraud.

Vendors and intermediaries may also offer a variety of value added services such as warranties, currency conversion, financing, training, installation, and maintenance. In one implementation, the proposals indicate whether the goods are sold with warranties. Intermediaries can extend or refuse to honor the warranties in the proposals. For example, the IT 125 might be an intermediary specializing in offering extended warranties—for a price. Thus, the proposals that reach the IP 141 via the IT 125 will indicate a longer warranty term and, presumably, a higher price.

Similarly, proposals indicate a currency. The vendors will typically operate only in a single currency, for example United States Dollars. Similarly, purchasers typically operate only in a single currency, for example British Pounds. The trader programs 120 and the manager programs 130 typically only transmit proposals in a single currency. However, the trader programs 120 and the manager programs 130 can have a currency conversion table that enables them to receive proposals in a currency other than their own and transmit a modified proposal in their currency. If the CR 115 is located in the United States and does business in dollars and the IP 141 is located Great Britain and does business in pounds, and the IP 141 wants to buy something from the CR 115, a proposal will only reach the IP 141 if at least one trader program or manager program is willing to convert the proposal from dollars to pounds.

B. Completing a Transaction

Figure 2A:
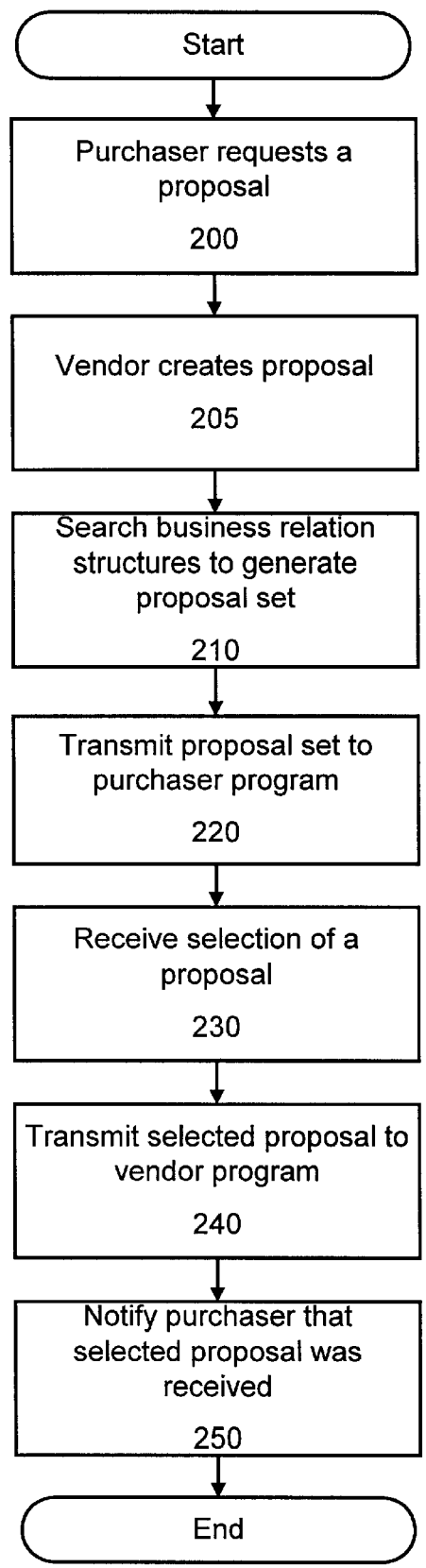
FIG. 2A illustrates one embodiment of a method of completing a transaction.

FIG. 2A describes one embodiment of a method for completing a transaction.

At step 200, a purchaser program sends a signal requesting a proposal for an item. The purchaser program sends the signal when the purchaser wants to buy something. The signal could be sent using the WWW over the physical layer 100. In one embodiment, the signal is sent by electronic mail messages over the physical layer 100. The request specifies the item the purchaser would like to buy from the vendor operating the cash register program.

At step 205, the cash register program receives the request and creates a proposal. In one implementation, before the cash register program sends the proposal to its business relations, the cash register program requests a unique identifier from the purchaser program to use in identifying the transaction. The unique identifier allows all the participants to the transaction to identify the proposal. In one implementation, anonymous transactions can also be conducted by providing an identifier that does not provide identifying information about the purchaser. For example, the unique identifier might include the purchaser's name and e-mail address, or other identifying information. In an anonymous transaction, the unique identifier would not include that information. The unique identifier would instead contain a number selected by the purchaser program or the manager program for the purchaser.

At step 210, a search of the business relation structures is then conducted to generate a set of proposals for the purchaser. In one implementation, this is done by conducting a breadth first search of business relation structures using communications layer 170. This search is described in detail below.

Next, at step 220, the proposal set is then transmitted to the purchaser program. Because each intermediary in the path between the purchaser and the vendor modifies the proposal to reflect the costs of extending credit, the purchaser program may receive more than one proposal if there was more than one path found in step 210.

At step 230, the purchaser program waits for a selection signal indicating a proposal is accepted. The selected proposal is called an order. In one embodiment either the manager program or the purchaser program can be configured by a purchaser to automatically accept certain proposals based on the originating vendor and the cost, both of the current proposal and the amount spent so far that month.

Once the selection signal is received, at step 240, the order, is transmitted to the cash register program. In one implementation, the selection signal is transmitted to the cash register program by way of the intermediaries corresponding to the order.

At step 250, upon receiving the order, the cash register program notifies the purchaser that the order was received. In one implementation, the cash register program immediately transmits the digital goods bought by the purchaser and completes the transaction. If a service has been purchased, the cash register program will begin carrying out the service and provide the purchaser information about the status of their transaction. For example, if a foreign stock trade was purchased, the cash register program would carry out the transaction and provide information to the purchaser about the completed transaction by updating the WWW page the purchaser is viewing.

In one implementation, the cash register program also issues a receipt to the purchaser. The receipt acts as a proof of purchase for the goods. In one implementation, the receipt can also be used for a vendor-designated period to re-request the purchased item at no additional charge.

It is important to mention that the purchaser need not accept any of the proposals. If, for example, all of the proposals are undesirable, then the purchaser can decide not to select any proposal. In that instance the purchaser program can either transmit a cancellation message to the cash register program or simply never complete the transaction by never transmitting a selected proposal (causing the proposals to timeout). Having the programs cryptographicly sign proposals can reduce fraud.

C. Searching the Business Relation Structures

Figure 2B:
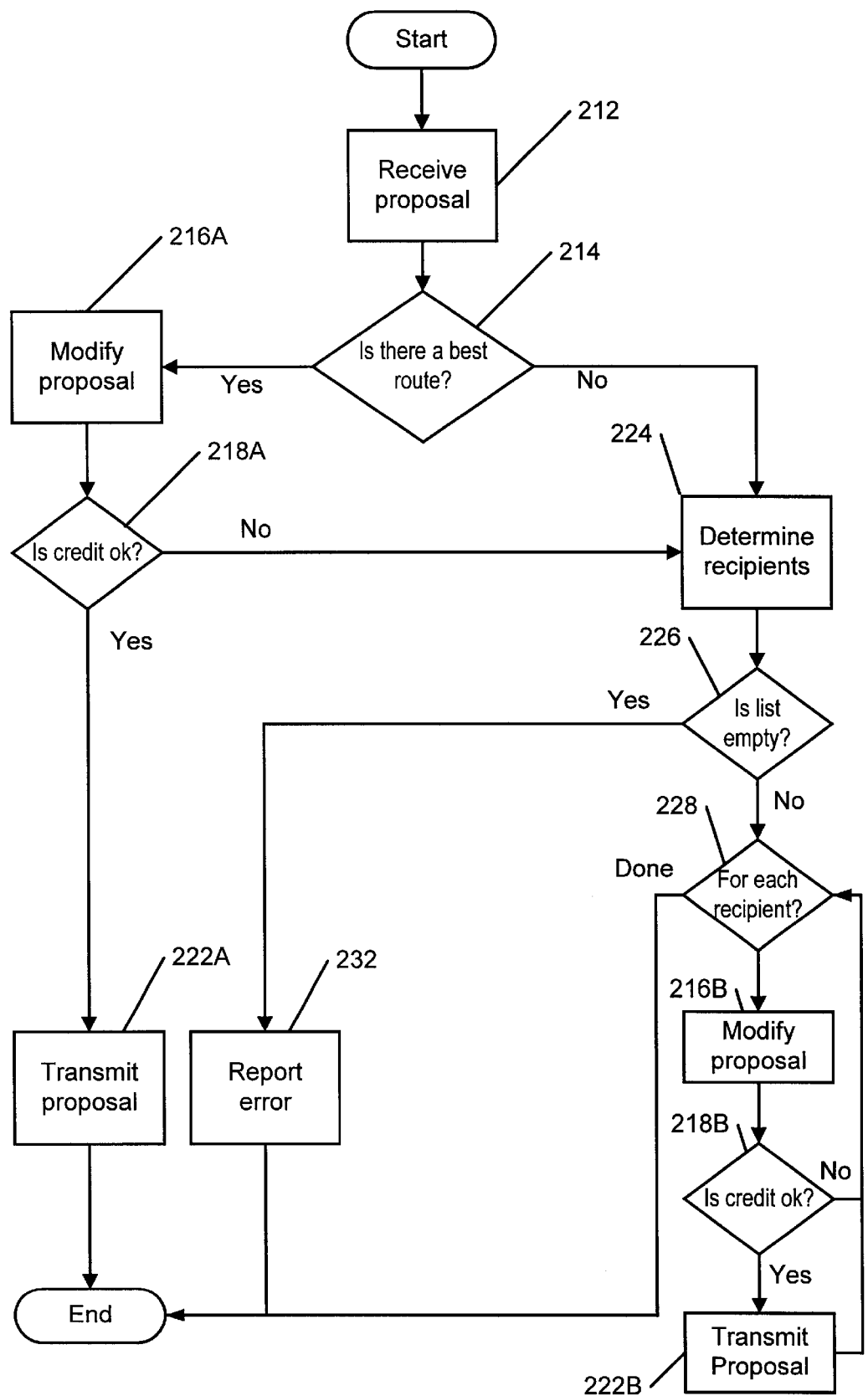
FIG. 2B illustrates one embodiment of a method of searching the business relation structures to generate a set of proposals.

FIG. 2B describes one embodiment of a method of searching the business relation structures to generate a set of proposals. This can be used in step 210 of FIG. 2A.

At step 212, a program (e.g. a trader program) receives a proposal. The program could be a trader program or a manager program. The proposal specifies the purchaser's identity. The proposal can be processed at this stage to ensure that certain preliminary criteria are met. For example, proposals that exceed a certain transaction amount can be refused. Proposals that have cryptographic signatures that can not be verified can be refused. Also, an intermediary can refuse to handle a transaction a second time to avoid the creation of loops. If a proposal reaches an intermediary for the second time, it is refused and an appropriate error message is returned to the sender. Loops are undesirable because a loop would increase the price for purchasing the good without assisting the process of extending credit to the purchaser.

Next, at step 214 a routing table is consulted to decide if there is a route known to the purchaser. If the routing table has an entry for the purchaser, control continues at step 216A. If no route exists, control continues at step 224.

At step 216A, the proposal is modified by the program to reflect the cost of extending credit and any additional value added services the intermediary is providing. For example, an intermediary could offer an extended warranty and charge for it. The credit risks involved as well as the agreements between the parties will also affect the markup. These credit risks and agreements are represented by the business relation structures.

Next, at step 218A, the credit of the party that is about to receive the proposal is examined. If the party is credit worthy, control proceeds to step 222A. Otherwise, control proceeds at step 224. This check is important because, business relation structures typically specify a maximum amount of credit that can be extended to a party. Therefore, it is useful to check that sending the modified proposal to the destination will not exceed the credit allowed for the destination party.

At step 222A, the proposal is transmitted to the destination. It is possible for the destination to be the purchaser program. Once the proposal has been successfully transmitted, the program stops. If an error occurs during transmission, an appropriate error message is returned.

At step 224, a list of recipients for the proposal is determined. This occurs if there was no route at step 214, or if the credit of the proposed route was bad at step 218A. Typically, this will be the list of all of the intermediaries and purchaser account managers that have business relations with the current intermediary.

Next, at step 226 the list of recipients is examined. If there are no recipients, control proceeds to step 232. If there are recipients, control proceeds to step 228.

At step 232, as there are no recipients, an error is reported back to the intermediary that sent the proposal. The sending intermediary will update its routing tables to indicate that the purchaser cannot be reached through this intermediary.

At step 228, if each recipient has been sent a proposal, the process ends. For each of the recipients, control proceeds to block 216B. The process of steps 216B–222B can be done in parallel or in sequence for each recipient.

At step 216B, the proposal is modified for the recipient. This process is the same as step 216A and control continues at step 218B.

At step 218B, the credit of the recipient is checked. This process is the same as step 218A, however, if the recipient has good credit, control continues with step 222B and if the recipient has bad credit, control continues with step 218.

At step 222B, the modified proposal is transmitted to the recipient. This process is the same as step 222A. Control then returns to step 228.

The error messages that come back from the recipients will be used to update the routing table for future proposals for the purchaser. Also, when the purchaser accepts a proposal, the intermediary will mark the recipient intermediary that transmitted the accepted proposal as the route to use for future proposals. To ensure that the routing tables remain current, they can be purged periodically.

Additionally, intermediaries can send messages indicating that their status has changed to cause other intermediaries to update their routing tables. For example, if the intermediary Bank A is brought online in the network, it will send a message to its business relations to update their routing tables.

The routing tables can be purged manually. Routes can be manually entered in the routing table. Routes can be fixed in place, e.g. so that a particular recipient program is the only route used for a purchaser, or multiple purchasers.

Also, weightings can be assigned to routes in the routing table based on the overall number of successful transactions a business relation has completed. For example, if an intermediary Bank B has completed a large percentage of the transactions for the program, routes relying on that intermediary can be favored. For example, if a purchaser P has no routing table entry and Bank B has done a high complete transaction history, Bank B can be used as a known route at step 214. Only if Bank B cannot route the proposal to purchaser P will control proceed to step 224.

The past credit history of intermediaries can also be considered in updating and adding entries to the routing table. For example, if an intermediary Bank C is not honoring its obligations to pay amounts due and there is a bad payment history, Bank C will not be used as a recipient at step 218A–B.

The routing process of FIG. 2B can be bypassed if a proposal pre-designates a list of intermediaries to use. In that case, the program receiving the proposal ensures that it is on the list intermediaries provided by the proposal. If it is, the proposal is modified and forward to the next intermediary on the list. This is the same as steps 216A–222A; however, if the credit of the listed recipient is not satisfactory, an error will be reported.

D. Accepting Proposals

Figure 2C:
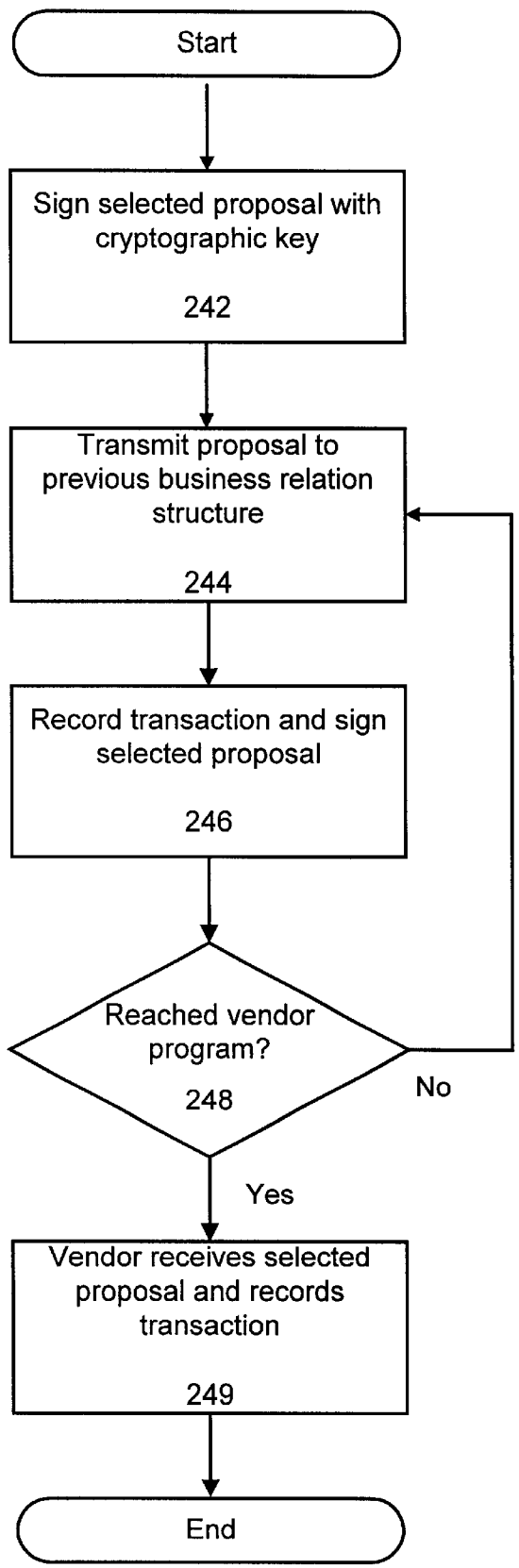
FIG. 2C illustrates one embodiment of a method of transmitting the accepted proposal to the vendor computer.

FIG. 2C describes one embodiment of a method of transmitting the selected proposal to the vendor. This can be used in step 240 of FIG. 2A.

At step 242, the purchaser program indicates the selected proposal by signing it cryptographicly. This reduces fraud because it makes it difficult for purchasers to claim that they did not request products. In one implementation, the use of cryptographic signatures is optional. In one embodiment, commercially available browser software such as Netscape Navigator™ is used to display the set of proposals to the purchaser. The proposals can be presented as a hypertext markup language (HTML) document inside the browser. In one embodiment, each proposal has a corresponding link associated with it. Alternatively, the proposals can be presented and using a Java™ program, a browser plug-in program, an application program, an electronic mail program, or some other program.

When the link in the HTML document receives a signal, the browser software then, at step 244, transmits the acceptance of the proposal to the previous business relation. This has the effect of transmitting the selected proposal back to the vendor via each of the intermediaries that are facilitating the proposal. For example, the selected proposal may have gone from the vendor to Bank X and from Bank X to Bank Y and from Bank Y to the purchaser via Bank Y's account manager. The signal indicating the selected proposal will travel that path in reverse. The signal will be transmitted to Bank Y's account manager, then to Bank Y, then to Bank X, and finally to the vendor.

As the signal indicating the selected proposal is transmitted back to the vendor, each program records the transaction at step 246. Recording the transaction involves a number of subsidiary steps. The receiving program extends credit to the intermediary that sent the signal indicating the selected proposal. The receiving program updates the business relation structures to reflect the current amount of credit extended to business relations. The receiving program updates past performance history and past credit history appropriately. In one embodiment, the cryptographic signature of the sender is verified before recording the transaction.

At step 248, if the cash register program can be reached, the proposal is transmitted to the vendor. Otherwise, at step 248, the process continues at step 244 with the transmission of the proposal to the previous business relation.

At step 249, the cash register program receives the proposal and records the transaction. In one embodiment, the cryptographic signature of the sending program is verified before recording the transaction. In another embodiment, the cryptographic signature of the purchaser program is verified before recording the transaction. Upon recording the transaction, the vendor is now obligated to provide the products purchased to the purchaser according to the terms of the accepted proposal.

In one embodiment, the cash register program issues a receipt to the purchaser program upon recording the transaction. This receipt acts as proof of purchase for the goods. The receipt can either be sent directly to the purchaser over the physical network layer coupling the vendor and the purchaser, or the receipt can be sent via the communications layer. In one embodiment, the receipt can specify a period of time in which the purchaser program can use the receipt to re-request the goods at no additional charge. This is mostly applicable to digitally purchased goods. The receipt serves an additional role as insurance against a transmission problem in the physical network layer. For example, a software product bought electronically might permit a two-day re-request period to protect against download and transmission failures. In contrast, a stock quote would likely come with a much shorter re-request time period because the value of product is time sensitive. In one embodiment, the cash register program updates the WWW page being viewed by the purchaser program to indicate that that sale is complete. The updated WWW page might contain the information that the purchaser bought or a link to the information. In the case of tangible goods, the updated page might reflect shipping information.

E. Extranet Setup

Figure 3:
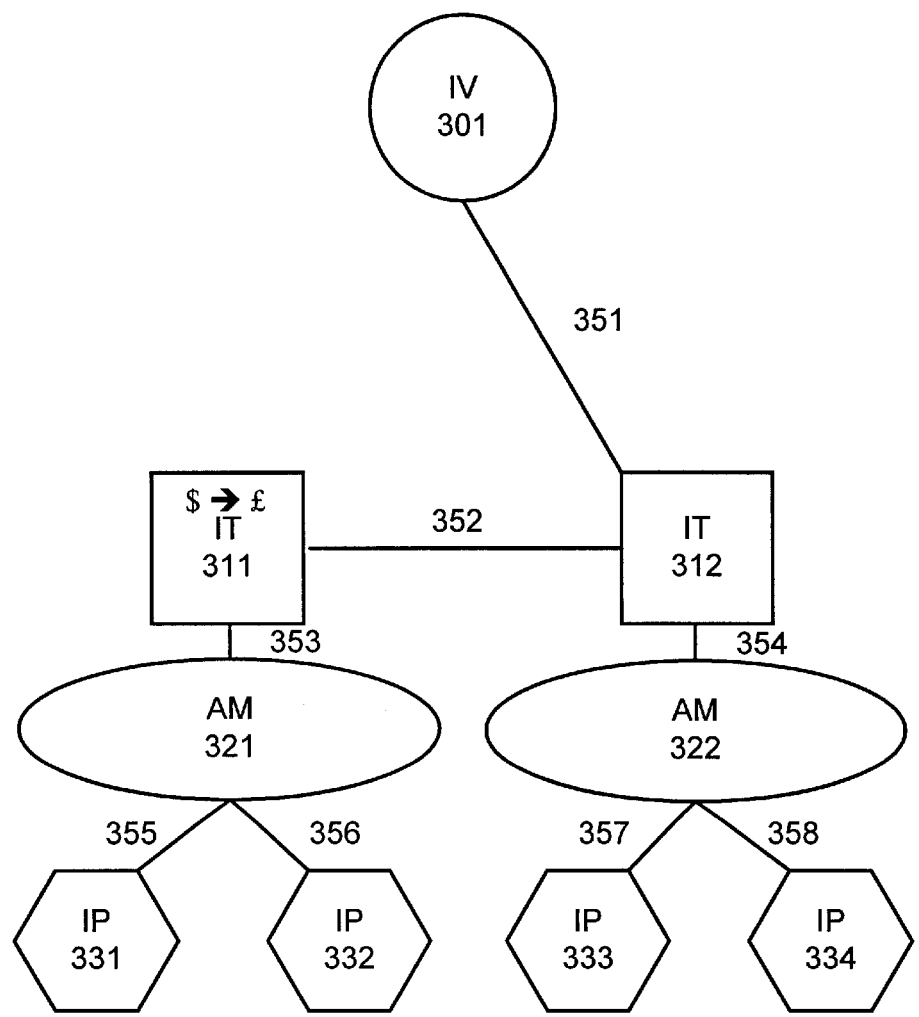
FIG. 3 illustrates computer systems that supports extranets.

FIG. 3 depicts networked computer systems organized to create a transaction network on an extranet using one embodiment of the invention. An extranet is an extension of a company's internal network, or intranet, that allows selected customers, suppliers, and others to access the corporate network and vice versa.

This paragraph lists the elements of FIG. 3. FIG. 3 comprises an extranet 300, an IV 301, an IT 311, an IT 312, an AM 321, an AM 322, an IP 331, an IP 332, an IP 333, an IP 334, a BL 351, a BL 352, a BL 353, a BL 354, a BL 355, a BL 356, a BL 357, and a BL 358.

This paragraph describes the interconnections between the elements of FIG. 3. The extranet 300 comprises the IV 301, the IT 311, the IT 312, the AM 321, the AM 322, the BL 351, the BL 352, the BL 353, and the BL 354. The IV 301 is coupled to the IT 312 by the BL 351. The IT 312 is coupled to the IT 311 by the BL 352. The IT 312 is coupled to the AM 322 by the BL 354. The IT 311 is coupled to the AM 321 by the BL 353. The AM 321 is coupled to the IP 331 by the BL 355. The AM 321 is coupled to the IP 332 by the BL 356. The AM 322 is coupled to the IP 333 by the BL 357. The AM 322 is coupled to the IP 334 by the BL 358.

FIG. 3 shows only the communications layer where programs are coupled by business links and does not show the physical network connections between the computers running the programs. The cash register programs, the trader programs and the account manager programs, that are part of the extranet 300, may be running on a single computer or multiple computers coupled via a network. The extranet 300 is configured to permit a vendor to handle a reduced community of companies doing business together. The account managers serve as distributors for the vendor. This arrangement is desirable for circumstances where a vendor prefers to handle its customers directly or the nature of the goods for sale by the vendor favors the use of a more private network. For example, a vendor might employ the extranet 300 for customer support or for providing confidential information. The extranet 300 can be coupled with intermediaries by business links to permit transactions with purchasers unknown to the vendor, or outside the extranet 300, if the vendor so chooses.

In the example of FIG. 3, IT 311 has a current table with currency conversion rates for United States Dollars and British Pounds Sterling. This increases the flexibility of the vendor to handle purchasers in different currencies while maintaining control of the transaction from the perspective of the user. The currency conversion process could also be located in the AM 321. Because all of the intermediaries in the extranet 300 are more closely controlled by the vendor, purchasers will typically only receive a single proposal; however, vendors could select multiple distributors to provide purchasers choices of warranty terms and financing.

F. Corporate Network Setup

Figure 4:
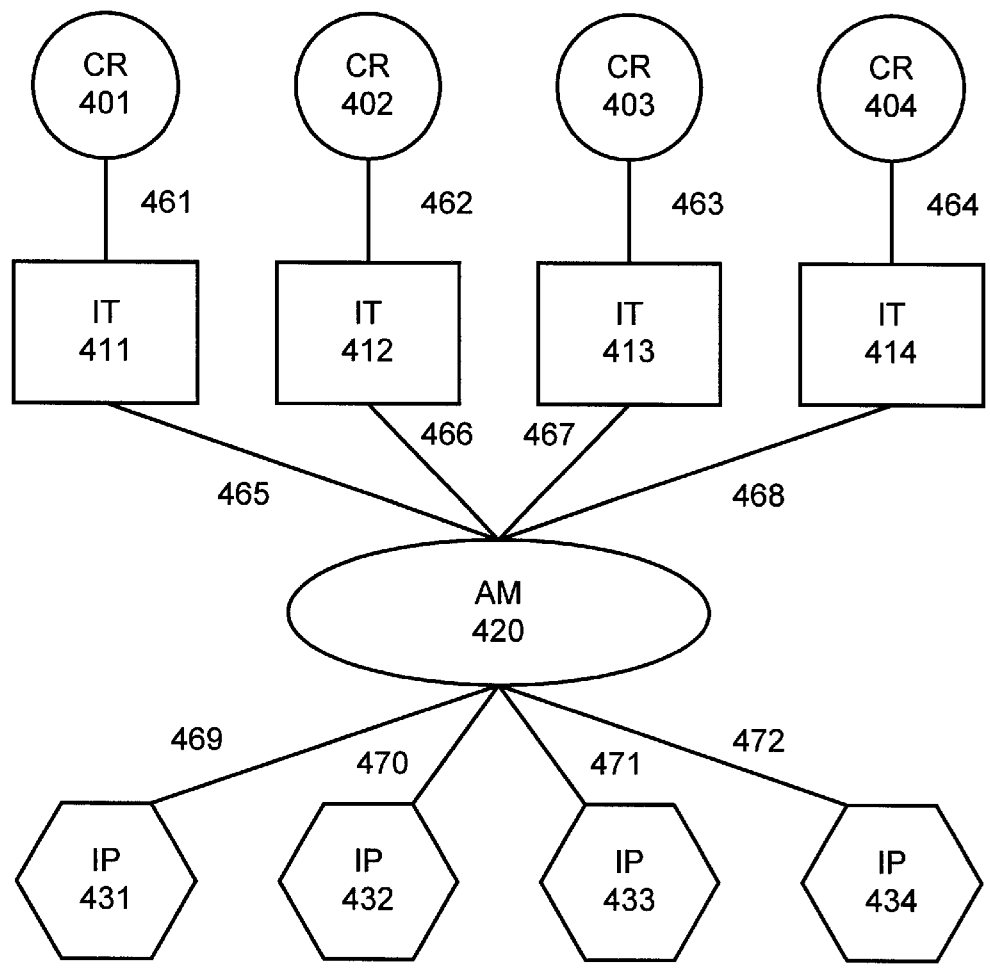
FIG. 4 illustrates computer systems that supports greater corporate control of transactions.

FIG. 4 depicts networked computer systems organized for corporate control of transactions using one embodiment of the invention.

This paragraph describes the elements of FIG. 4. FIG. 4 comprises a CR 401, a CR 402, a CR 403, a CR 404, an IT 411, an IT 412, an IT 413, an IT 414, an AM 420, an IP 431, an IP 432, an IP 433, an IP 434, and the BLs 461–472.

This paragraph describes the interconnections between the elements of FIG. 4. The CR 401 is coupled to the IT 411 by BL 461. The CR 402 is coupled to the IT 412 by BL 462. The CR 403 is coupled to the IT 413 by the BL 463. The CR 404 is coupled to the IT 414 by the BL 464. The ITs 411–414 are coupled to the AM 420 by the BLs 465–468. The IPs 431–434 are coupled to the AM 420 by the BLs 469–472.

FIG. 4 depicts the communications layer where programs are coupled by business links and does not show the physical network connections between the computers running the programs. The trader programs, account manager programs and purchaser programs in FIG. 4 may be running on a single computer or may be running on multiple computers coupled by a network. This setup is designed to allow a corporation to control electronic commerce between its employees and a set of vendors.

The vendors and the company have entered into agreements with set discounts, payment terms and the like. The company then permits its employees to access the preferred vendors through the AM 420. The AM 420 can impose business rules such as requiring secondary authorization, budget constraints, auditing requirements, etc. Thus, purchasing decisions are easy to control before commitment is made to the vendor. Auditing and decision making based on internal company rules is also facilitated.

G. Component Interactions

The following describes component interactions and their purpose, according to some embodiments of the invention.

1. Cash Register Operation Modes

In order to present its items or services for sale, the vendor uses an application program such as a web server, an electronic storefront program, or some other program. This application program handles the basic communications with the purchaser until a proposal is requested. At that point, the application program sends a message to the cash register program that the vendor is running and requests that a proposal be generated. The request includes certain parameters for the proposal including a description of items, prices, and a manner for connecting to the purchaser.

The cash register program may also act as a proxy server, such as a hypertext transfer protocol (HTTP) proxy server. The cash register program can be programmed to automatically intermediate HTTP transmissions from the vendor to the purchaser that are tagged in a predefined manner. For example, the cash register could look for a <META>tag indicating a price. In that instance, the cash register program will not permit delivery of the web page to the purchaser until the designated price has been paid. Alternatively, an extensible markup language (XML) tag could be used to signal the cash register program to charge for the delivery of content. Alternatively, a different Internet protocol (IP) could be used to convey the packets to the cash register program to charge for the delivery of content..

This embodiment offers the unique advantage that the existing web server software and other software that supports a commerce site does not need to be altered by the vendor. A vendor can set up a commerce site using the cash register program in proxy mode easily. In this mode, the cash register program intercepts packets from the web server, or other server, destined for clients. This is done by configuring the cash register program as the gateway for packets from the web server to the client. This allows the cash register program to analyze the intercepted packets to determine if there is a price associated with receiving the packets. If the cash register program determines that data destined for the client has a price, e.g. because there is a <META>tag in the HTML indicating a price, the cash register program will delay transmission of the data while a proposal is generated and routed to the client, purchaser. Only when the client, purchaser, has accepted a proposal will the cash register program complete the transmission of the data to the client. Thus, once the cash register program is the gateway or proxy for the web server, commerce functionality is enabled simply by providing a flag with the price on any web pages that should have a cost. The web page itself might be the good purchased, alternatively, the web page might provide a link to the good or confirmation that the good is being shipped.

In another embodiment, the cash register program interacts with a mail server. This enables the cash register program to listen for electronic mail and send electronic mail and complete the proposal and purchase approval process through electronic mail. The cash register program can listen for electronic mail from a vendor's application program to initiate the proposal process. The cash register program then sends an electronic mail to the purchaser through the network of business relations. Once an acceptance of a proposal reaches the cash register program by electronic mail, an electronic mail is sent to the vendor's application program by the cash register program indicating that payment has been made and the goods should be delivered.

In one embodiment, the application program communicates with the cash register program through an interface designated by the cash register program such as a remote procedure call interface, a shared library interface, an object linking and embedding interface, or some other interface.

2. Manager Program Operation

The manager programs are responsible for receiving the proposals from the trader programs and conveying them to the purchaser. The manager programs communicate with a purchaser. The communication can be by electronic mail, by direct communication with the purchaser program, or through some other communications means. For example, the manager program could designate a web page for a specific purchaser. The purchaser can then review the web page periodically and make her/his selections. In another embodiment, the purchaser program could be activated by a message from the manager program and display the proposals to the user immediately.

H. Sample Data Structures and Implementation

The following describes data structures and their use, according to some embodiments of the invention.

1. Data Structures

One implementation uses several different data structures to complete transactions. The basic data structures are a purchaser identifier, a role identifier, a currency identifier, a time stamp, an Internet Protocol address identifier, transaction identifiers, and a good identifier. These basic data structures are in turn used to create more complex data structures. Some of these complex data structures are for storing prices, transactions, tokens, tickets, and signatures.

A price data structure comprises an amount and a currency identifier. The amount is expressed as an integer in thousandths of the currency unit. For example, if the currency identifier specifies that United States Dollars are used, then one dollar would be represented by the amount "1000." The amount could also be specified as an amount per unit. For example, time at a computer controlled telescope might be purchased in minutes, therefore a proposal could specify an amount per unit.

A transaction data structure comprises a role identifier, a time stamp, and a transaction identifier. The role identifier designates the vendor or intermediary who is creating the transaction data structure. The time stamp specifies the time at which the transaction data structure was created. The transaction identifier can uniquely identify a specific transaction for all participants.

The token data structure comprises a role identifier, a time stamp, and a transaction identifier. The role identifier will designate the account manager who is creating the token data structure.

Ticket data structures serve as a receipt for goods or services that have been sold. One important purpose served by the ticket data structure is to permit users to re-request digital goods that did not properly download across the network. Ticket data structures comprise a role identifier, a good identifier, a purchaser identifier, a time stamp, a duration, and a signature. The role identifier designates the vendor who is creating the ticket data structure. The duration specifies the number of seconds from the time indicated by the time stamp for which the ticket can be used to re-request the good identified by the good identifier. The signature is a signature data structure.

The signature data structure comprises a type identifier and a signature. The type identifier describes what security protocol was used to create the signature. The signature can be a digital signature created by public key cryptography based on X.509 certificates. When business relationships are formed initially, parties to the business relationships exchange or create certificates to enable digital signatures. In order to speed the transaction process, parties in a business relationship may agree to sign only certain transactions, e.g. those exceeding a certain dollar amount. Additionally, the parties in a business relationship can periodically trade signed messages containing details of many previously unsigned transactions.

2. Communications Protocol

The following describes the communications protocol used in some embodiments. The communications protocol describes the messages that are communicated between the parties to initiate, monitor, and complete a transaction. The messages can be transmitted over the network using the Transmission Control Protocol (TCP) or other protocols.

A vendor asks purchasers to identify themselves by transmitting information about the good to the purchaser. This is called a purchaser information request message and it comprises a good identifier, a description of the good, and information about whether or not anonymous transactions are permitted. In one implementation vendors can indicate that anonymous transactions are permitted, forbidden, or that they prefer not to do anonymous transactions.

Upon receiving purchaser information requests, purchasers transmit to the cash register, their certificate. The certificate is an identifier that was provided to the purchaser when they formed their business relationship with their account manager. The certificate uniquely identifies the purchaser. The account manager is not involved in this stage because the purchaser program stores its certificate locally. If a purchaser prefers anonymity, they can request an anonymous certificate from their account manager that contains a nickname rather than their true identity. This prevents parties other than the account manager from matching the a purchaser request with a purchaser. Similarly, the vendor can describe its goods generically to prevent account managers from monitoring purchases.

The communications protocol defines messages for transmitting ticket data structures and using ticket data structures to re-request delivery of goods. The communications protocol defines messages for providing the user a descriptive message on the progress of the transaction. In the case of errors, an error message is used that describes the error and identifies the intermediary or account manager that is preventing the transaction from being completed.

Still further messages are used by the communications protocol between participants. Proposal messages are sent between participants. Proposal messages represent a firm offer from a vendor to sell the designated good at the designated price. Proposal messages are modified by participants to reflect the cost of extending credit. Proposal messages include information such as the period for which the proposal is valid, the warranty terms, and a cryptographic signature by the sender.

Approval messages are sent by the purchaser through the sequence of business links identified by the proposal back to the vendor to indicate the acceptance of a proposal. Approval messages include the transaction identifier, the price, and a cryptographic signature. Similarly, user cancellation messages can be used by the purchaser to indicate that they do not wish to purchase an item.

Invoice and refund messages are sent by the vendor to the purchaser through the sequence of business links identified by the accepted proposal. Invoice messages are sent after the purchaser has sent an approval message to cause the intermediaries and the account manager to record the transaction. Refund messages are used to roll back transactions that have been invoiced. Each proposal can specify a maximum amount period for a refund and once that period expires, the transaction can not be rolled back.

Other components of the communications protocol are used to maintain information for routing proposals in the communications layer as well as for error recovery and error reporting.

3. Finding Sequences of Business Links

Because transactions and proposals occur along sequences of business links, or credit routes, that couple the cash register program and the purchaser program, it is important for intermediaries to maintain routing information that will speed the delivery of proposals to purchasers.

As messages are transmitted using the communications protocol a variety of error messages will be generated by participants should transmissions fail or time out. The error messages can be used to maintain routing information. Further, participants can send a message requesting new routing information. By using the information gathered in the process of using the communications protocol to maintain the routing table, the number of recipients for each proposal is reduced.

In one implementation, the routing table used by intermediaries is organized based on account managers. Entries in the routing table comprise a destination, an identifier for the next recipient and a mark. The destination is a account manager identifier. The next recipient is either another intermediary or the account manager. The mark is one of three values: best route, possible route, and no route. The mark is used to decide which entry for a account manager will be used to convey a proposal.

As a request is made to convey a proposal to a account manager, the routing table is consulted. If there no entry for that account manager, then the intermediary must find a new path. This is accomplished by sending the proposal to all of the intermediary's business relations, except for the intermediary that sent the proposal, and waiting. The information conveyed back to the intermediary by the communications protocol allows the intermediary to mark the route in the routing table. If a business relation of the intermediary sends a message that no route is possible then an entry is made in the routing table with the account manager identifier, the identifier for that business relation, and the mark no route. If a business relation of the intermediary is used to convey a proposal successfully, an entry is made in the routing table with the account manager identifier, the identifier for that business relation, and the mark best route. The other business relations all receive entries marked as possible routes.

If upon receiving a request to convey a proposal to a account manager with entries in the routing table, the routing table information is used. The proposal is first sent along the entry marked best route and only sent along the other routes if an error occurs. Routing table entries have their marks changed in response to messages. For example, if the entry with the mark of best route fails to convey the proposal, the entry will be changed so the mark is possible route.

In order to maintain the quality of the routing table, the information is periodically refreshed. This can occur using communications protocol messages that request that business partners reset the sender's routing information. For example, if Bank X has not received many proposals from Bank Y, Bank X could send a route-reset message to Bank Y. Upon receiving the route-reset message, Bank Y would then update its routing table entries for Bank X. Additionally, each intermediary might also reset the marks for routing table entries periodically to ensure the discovery of new routes.

4. Transaction Overview

This section describes the usage of the data structures, the communications protocol, and the routing tables in a sample transaction.

The purchaser uses his/her computer to access the Internet. The purchaser can use commercially available browser software such as Netscape Navigator™ to view WWW pages and review information. Other programs can also be used to access the Internet such as Java™ applications, plug-in programs, electronic mail programs, and other software programs. The items that are for sale can be presented in HTML or some other fashion. When the purchaser signals that he/she is interested in an item that is for sale the following occurs.

The cash register program uses the communications protocol to request information about the purchaser from the purchaser program. The information is then conveyed back to the cash register program with a purchaser information provided message.

The cash register program then uses the information about the purchaser to create the proposal. The proposal is then sent to the vendor's intermediary. The intermediary's trader program receives the proposal and adds a markup. The trader program then uses the routing tables to find a route to convey the proposal to the purchaser's account manager.

The manager program receives proposals and forwards them to the purchaser program. The purchaser program on the purchaser's computer displays the proposals. The proposals could be displayed directly in the browser or might be shown using a Java™ program, browser plug-in, electronic mail programs, or some other program. The purchaser can then accept one of the proposals or reject them by selecting a proposal from the list. The purchaser program then uses that selection to send an appropriate message. In the case where the purchaser has approved a proposal, an approval message will be sent.

The purchaser program then transmits the appropriate message to the manager program in response to the purchaser's signal. The manager program then conveys the approved proposal to the cash register program using the reverse sequence of business links that conveyed the proposal to the purchaser.

Upon receiving the approval message, the cash register program sends a receipt, ticket data structure, to the purchaser program. The vendor also delivers the order to the purchaser. Invoice messages are sent by the cash register program to close out the transaction.

I. Alternative Embodiments

Some embodiments of the invention are included in computer usable media such as CD-ROMs, or other computer usable media. The computer usable media can comprise the software for cash register programs, trader programs, manager programs, and purchaser programs.

Some embodiments of the invention are included in one or more of the programs on the intermediaries, account managers, or purchaser computers.

Some embodiments of the invention are included in an electromagnetic wave form. The electromagnetic wave form comprises information such as proposals, approval messages, and other messages that comprise the communications between the participants in a transaction, or the programs.

J. Conclusion

Thus, a method and apparatus for electronic commerce has been described. The method permits vendors and purchasers to complete transactions over a network. The method enables a large volume of low priced transactions by facilitating the extension of credit to purchasers without requiring the vendor to act as the creditor. The system offers unique benefits for the global nature of Internet commerce by permitting the conversion of currencies and payment methods.

The system enables corporations to decentralize their purchasing process while keeping control of their expenses.

Further, the system enables the purchases to be linked with internal account numbers and budget items at the time of purchase. This enables a community of businesses to handle their business flow efficiently when the goods and invoices are flowing along different paths. Further, this system enables the rapid deployment of commercial sites through the proxy setup of the cash registers.

What is claimed is:

1. A method of communicating an acceptance of a proposal via a plurality of computers coupled in communication in a network, said proposal identifying a good to be purchased and a price, said price describing the cost for purchasing said good using said proposal, said plurality of computers including a vendor computer and a purchaser computer, said network supporting a plurality of business relation structures, each business relation structure of said plurality of business relation structures representing an agreement to extend credit between at least two businesses, said method comprising:

generating a first proposal from said vendor computer, said first proposal identifying said good and a first price, said first price corresponding to the cost of purchasing said good using said first proposal;

generating a set of proposals from said first proposal and said plurality of business relation structures, wherein said generating includes, searching said plurality of business relation structures to determine a plurality of paths between said vendor computer and said purchaser computer, each path in said plurality of paths corresponding to a sequence of business relation structures between said vendor computer and said purchaser computer, creating said set of proposals, each proposal of said set of proposals having a corresponding path in said plurality of paths, and including in each proposal of said set of proposals any changes in said first price as a result of the business relation structures used to extend credit;

transmitting said set of proposals to said purchaser computer;

receiving a selection of said proposal from said set of proposals; and transmitting said selection to said vendor computer indicating said proposal is accepted.

2. The method of claim 1 wherein said generating said first proposal from said vendor computer includes:

signing said first proposal using a cryptographic key identifying said vendor computer.

3. The method of claim 1 wherein said searching said plurality of business relation structures to determine said plurality of paths between said vendor computer and said purchaser computer includes:

a breadth first search of said plurality of business relation structures.

4. The method of claim 1 wherein said searching said plurality of business relation structures to determine said plurality of paths between said vendor computer and said purchaser computer includes:

maintaining a plurality of past credit histories, each past credit history of said plurality of past credit histories having a corresponding business relation structure in said plurality of business relation structures;

eliminating from said plurality of paths each path whose corresponding sequence of business relation structures between said vendor computer and said purchaser computer includes a business relation structure whose corresponding past credit history is unfavorable.

5. The method of claim 1 wherein said generating said set of proposals from said first proposal and said plurality of business relation structures includes:

maintaining a plurality of past results of said searching said plurality of business relation structures;

eliminating from said plurality of past results each past result which is older than a predetermined period;

generating said set of proposals using said plurality of past results if at least one past result of said plurality of past results has not been eliminated.

6. The method of claim 1 wherein each business relation structure specifies a total credit value, said total credit value indicating a total amount of credit that can be extended under said agreement represented by said business relation structure, said searching said plurality of business relation structures to determine a plurality of paths between said vendor computer and said purchaser computer includes:

generating a plurality of current credit values, each current credit value of said plurality of current credit values having a corresponding business relation structure, each current credit value indicating an amount of credit currently extended between said at least two businesses in said corresponding business relation structure;

eliminating from said plurality of paths each path whose corresponding sequence of business relation structures between said vendor computer and said purchaser computer includes a business relation structure whose corresponding current credit value exceeds said total credit value corresponding to said business relation structure; and eliminating from said plurality of paths each path whose corresponding sequence of business relation structures between said vendor computer and said purchaser computer includes a business relation structure whose corresponding current credit value plus said price specified by said proposal corresponding to said path exceeds said total credit value specified by said business relation structure.

7. The method of claim 1 wherein said price of said first proposal is specified in a first currency and said proposal specifies that said purchaser computer requires that said price be specified in a second currency, said including in each proposal of said set of proposals any changes in said first price as a result of the business relation structures needed to extend credit includes:

specifying said price in said second currency; and adding to said price charges for converting from said first currency to said second currency.

8. The method of claim 1 wherein said including in each proposal of said set of proposals any changes in said first price as a result of the business relation structures needed to extend credit includes:

at least one or more of adding a warranty to at least one proposal in said set of proposals, eliminating a warranty from at least one proposal in said set of proposals, and changing said price of at least one proposal of said set of proposals based on whether or not said at least one proposal has a warranty.

9. The method of claim 1 wherein said including in each proposal of said set of proposals any changes in said first price as a result of the business relation structures needed to extend credit includes changing said price to specify said price as financing terms for the purchase of said good in installment payments.

10. The method of claim 1 wherein said transmitting said set of proposals to said purchaser computer includes:

transmitting each proposal of said set of proposals to each computer of said plurality of computers in the corresponding path from said vendor computer to the said purchaser computer.

11. The method of claim 1 wherein said transmitting said set of proposals to said purchaser computer includes:

using a cryptographic key to sign each proposal of said set of proposals.

12. The method of claim 1 wherein said receiving said selection of said proposal from said set of proposals includes:

signing said proposal using a cryptographic key identifying said purchaser computer.

13. The method of claim 1 wherein said transmitting said selection to said vendor computer indicating said proposal is accepted includes:

transmitting said selection to each computer of said plurality of computers in said path from said purchaser computer to said vendor computer corresponding to said proposal.

14. A method of facilitating the transmission of a proposal with a first computer using a plurality of computers coupled in communication by a network, said proposal identifying a good to be purchased, a price describing the cost for purchasing said good using said proposal, identifying a purchaser computer requesting said proposal and identifying a vendor computer offering said proposal, said network supporting a plurality of business relation structures representing an agreement to extend credit between at least two businesses, said method comprising:

determining a first set of business relation structures to receive proposals from;

receiving said proposal on said first computer, said proposal being sent from a business relation structure in said first set of business relation structures;

determining whether to facilitate said proposal; and responsive to said determining:

modifying said proposal as a result of the business relation structures used to extend credit, determining a second set of business relation structures to receive said proposal, and transmitting said proposal to said second set of business relation structures from said first computer.

15. The method of claim 14 wherein said determining said second set of business relation structures to receive said proposal includes:

maintaining a plurality of past credit histories, each past credit history of said plurality of past credit histories having a corresponding business relation structure in said plurality of business relation structures;

eliminating from said second set of business relation structures each business relation structure whose corresponding past credit history is unfavorable.

16. The method of claim 14 wherein said determining said second set of business relation structures to receive said proposal includes:

maintaining a plurality of past fraud histories, each past fraud history of said plurality of past fraud histories having a corresponding business relation structure in said plurality of business relation structures;

eliminating from said second set of business relation structures each business relation structure whose corresponding past fraud history is above a predetermined limit.

17. The method of claim 14 wherein said modifying said proposal as a result of the business relation structures needed to extend credit includes:

increasing said price to reflect the cost of extending credit.

18. The method of claim 14 wherein said price is specified in a first currency and said proposal specifies that said purchaser computer requires that said price be specified in a second currency said modifying said proposal as a result of the business relation structures needed to extend credit includes:

specifying said price in said second currency; and increasing said price to reflect the cost of converting from said first currency to said second currency.

19. The method of claim 14 wherein said modifying said proposal as a result of the business relation structures needed to extend credit includes:

changing said price to specify said price as financing terms for the purchase of said good in installment payments.

20. The method of claim 14 wherein each business relation structure specifies a corresponding total credit value, said total credit value indicating a total amount of credit that can be extended between said agreement represented by said business relation structure, said determining a second set of business relation structures to receive said proposal includes:

generating a plurality of current credit values, each current credit value of said plurality of current credit values having a corresponding business relation structure, each current credit value indicating the amount of credit currently extended between said at least two businesses in the corresponding business relation;

eliminating from said second set of business relation structures each business whose corresponding current credit value exceeds said total credit value corresponding to said business relation structure; and eliminating from said second set of business relation structures each business relation structure whose corresponding current credit value plus the amount of credit needed to complete said proposal exceeds said total credit value corresponding to said business relation structure.

21. The method of claim 14 wherein said determining said second set of business relation structures to receive said proposal includes:

maintaining a plurality of past acceptance histories, each past acceptance history of said plurality of past acceptance histories having a corresponding business relation structure in said plurality of business relation structures; and eliminating from said second set of business relation structures each business relation structure whose corresponding past acceptance history is lower than a predetermined amount.

22. The method of claim 14 wherein said transmitting said proposal to said second set of business relation structures includes:

signing said proposal using a cryptographic key identifying said first computer.

23. The method of claim 14 wherein said proposal includes a cryptographic signature, said determining whether to facilitate said proposal includes:

verifying said cryptographic signature; and refusing to facilitate transactions when said cryptographic signature can not be verified.

24. The method of claim 23, wherein the cryptographic signature is a DES signature.

25. The method of claim 23, wherein the cryptographic signature is a PGP signature.

26. The method of claim 22, wherein the cryptographic key identifying said first computer is a DES key.

27. The method of claim 22, wherein the cryptographic key identifying said first computer is a PGP key.

* * * * *